United States Patent [19]
Spooner

[11] 3,933,089
[45] Jan. 20, 1976

[54] SAFETY GUARD FOR PRESS
[75] Inventor: Robert E. Spooner, Chicago, Ill.
[73] Assignees: Robert E. Spooner; Sylvia M. Spooner, both of Chicago, Ill.
[22] Filed: Feb. 13, 1975
[21] Appl. No.: 549,734

[52] U.S. Cl. .................. 100/53; 74/612; 83/544; 164/152; 192/129 B; 192/131 R; 192/137; 425/152
[51] Int. Cl.² .................................. B30B 15/16
[58] Field of Search ........ 100/53; 83/397, 544, 545, 83/546; 74/612, 615, 616; 164/152; 425/151, 152; 192/129 R, 129 B, 131 R, 133, 137

[56] References Cited
UNITED STATES PATENTS
3,819,022  6/1974  Svensson .......................... 74/612

FOREIGN PATENTS OR APPLICATIONS
220,724    3/1959   Australia ........................ 100/53
595,557    12/1947  United Kingdom ............. 425/152
1,180,051  2/1970   United Kingdom ............. 192/133

Primary Examiner—Billy J. Wilhite
Attorney, Agent, or Firm—Dressler, Goldsmith, Clement & Gordon, Ltd.

[57] ABSTRACT

Safety apparatus for a press or the like having dies which are movable relative to each other and which define an open area therebetween for receiving an article includes a gate that is pivotable about a primary pivot axis from an open position to expose the open area to a closed position to shield the open area, and a secondary pivot axis that is parallel to and spaced from the primary axis. In the closed position, the gate engages a normally closed switch means and thereby enable the dies to move towards each other. When the gate is in the closed position and an obstruction is aligned with the gate, movement of the dies causes the obstruction to contact the gate which is pivoted about the secondary pivot axis, whereby the switch means closes and movement of the dies is interrupted.

13 Claims, 4 Drawing Figures

SAFETY GUARD FOR PRESS

BACKGROUND OF THE INVENTION

This invention relates to safety devices for machine tools. More particularly, it comprises a press guard which can be interposed between a worker and a press to prevent the worker from being injured by the press.

With the usual press, the press operator is required to sequentially and continuously place parts into the die or a mold between the platens with his hands. The operator than removes his hands from the die area and usually trips the press operating valve with his hand or foot. This tripping of the press, acting through a valve mechanism, actuates the ram of the press to do work on the mold and/or parts therein. If the operator fails to remove his hand or hands, an accident causing serious personal injury results. If the part or mold is placed incorrectly on the die or press, or an obstruction is otherwise between the platens or dies, and the press is tripped, costly damage to equipment as well as personal injuries to the operator could result.

Safety devices to protect the press operator, and/or guard against damage to the press and dies, are known, but such devices have not been entirely satisfactory. Most prior art press guards are screen-type guards which allow no access to the press area, thereby preventing injuries. In order to obtain any access to the press area, the screen must be removed. Usually, a special switch is provided which turns off the machine when the screen is removed. Unfortunately, there are many circumstances in which it is desirable to obtain at least partial access to the press area without removing the press guard. Consequently, the screen-type guards are a nuisance since they must constantly be removed before access can be obtained. Accordingly, many press operators simply remove the screens and risk injury in order to maintain ready access to the press area.

SUMMARY OF THE INVENTION

The present invention comprises a safety apparatus for a machine such as a press that has dies or molds which are movable relative to each other by a fluid ram and which define an open area therebetween for receiving an article. The safety apparatus includes a gate that is pivoted about a primary pivot axis during normal operation, and is automatically pivotable about a secondary pivot axis to stop the press when there is an obstruction, such as the operator's arm, aligned with the gate.

The safety apparatus includes a protective pneumatic circuit that prevents movement of the ram when the gate is not in a closed position protecting the open area. The protective circuit includes two or more pneumatic valves in the pneumatic-hydraulic operating circuit for the ram and the valves are normally held in a closed position preventing hydraulic fluid from being supplied to the ram. The pneumatic valves are positioned in series in a pneumatic circuit which operates the hydraulic press actuating valve and are normally closed. These normally closed valves in the pneumatic circuit are opened only when the gate is in a protective position and must be open to supply fluid through the hydraulic circuit and actuate the ram.

There are at least two normally closed valves or switch means in the pneumatic circuit so that if the operator attempts to operate the press with the guard gate up, he must use both hands and thus will be safe from injury. Should the operator remove either hand from contact with the valve, the press will open.

The normally closed valves in the pneumatic circuit are preferably actuated by cams on the gate, thus engaging the levers that actuate the valves as the guard gate is brought down. The levers and cams are positioned so that the cams move beyond free ends of the levers when the gate is pivoted about the secondary pivot axis and latch in this position. The gate must then be opened manually before the pneumatic control valve in the hydraulic circuit can again be opened.

DESCRIPTION OF THE PREFERRED EMBODIMENTS

Figure 1:
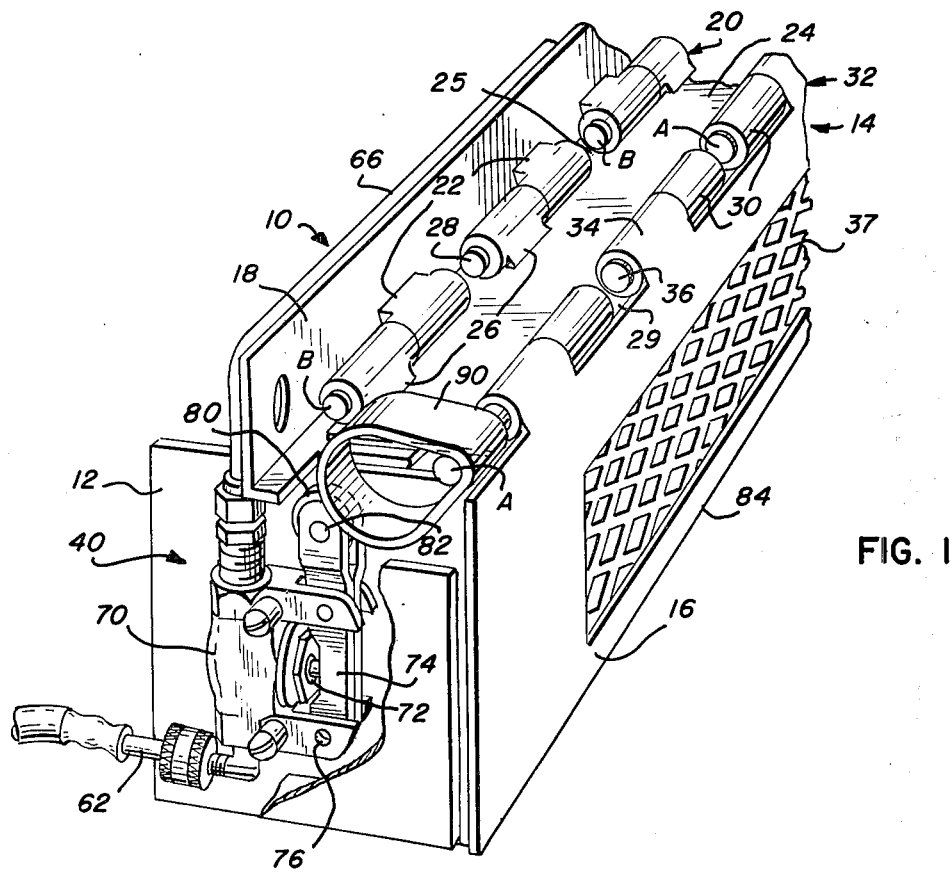
FIG. 1 is a fragmentary perspective view of the safety guard apparatus of the present invention which is mounted in front of the opening of the machine or other apparatus whose opening is to be guarded.

As illustrated in the drawings, the present invention may be effectively embodied in any well-known and conventional press 10 or other machine having relatively movable dies or platens 13 defining an open area 11 between them for receiving an article. The safety apparatus 14 may comprise a main frame 12 placed in front of mating dies or platens 13, which define an open area therebetween for receiving an article. The dies are moved relative to each other by a ram means 15 which is generally of heavy weight and is moved or operated by fluid supplied through a hydraulic circuit, to be described later.

The safety apparatus 14 of the present invention includes a gate 16 which pivots about a primary pivot axis A—A during normal operation from an open position (FIG. 4) to a closed position (FIG. 1), and about a secondary pivot axis B-B when an obstruction is aligned with the gate (FIG. 3), thereby interrupting the movement of the dies to prevent them from mating, as will be described in more detail later. When gate 16 is in the open position, the open area between the dies is exposed; when the gate is in the closed position, the open area between the dies is shielded by the gate.

Figure 3:
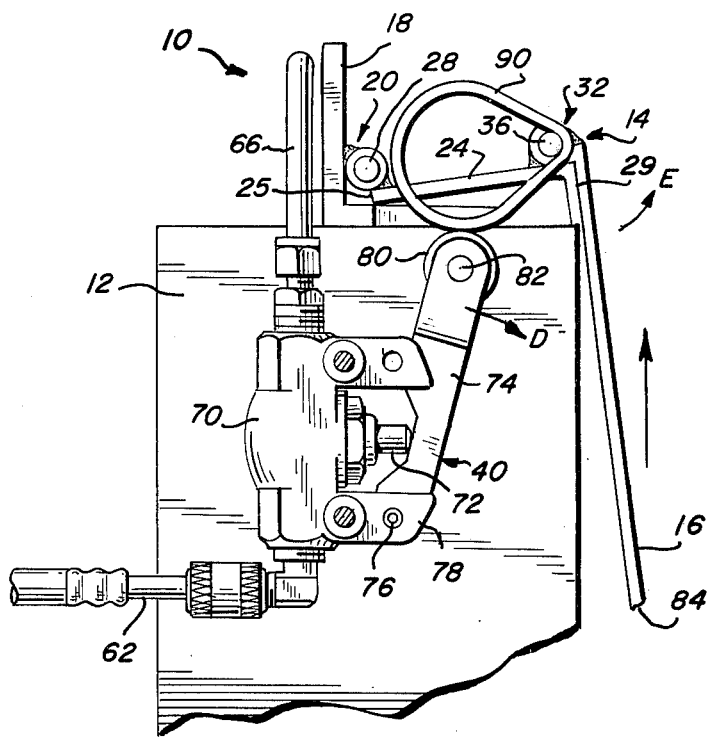
FIG. 3 is a fragmentary side elevational view of the safety apparatus of FIG. 1 in the position assumed when an obstruction contacts the gate.
Figure 4:
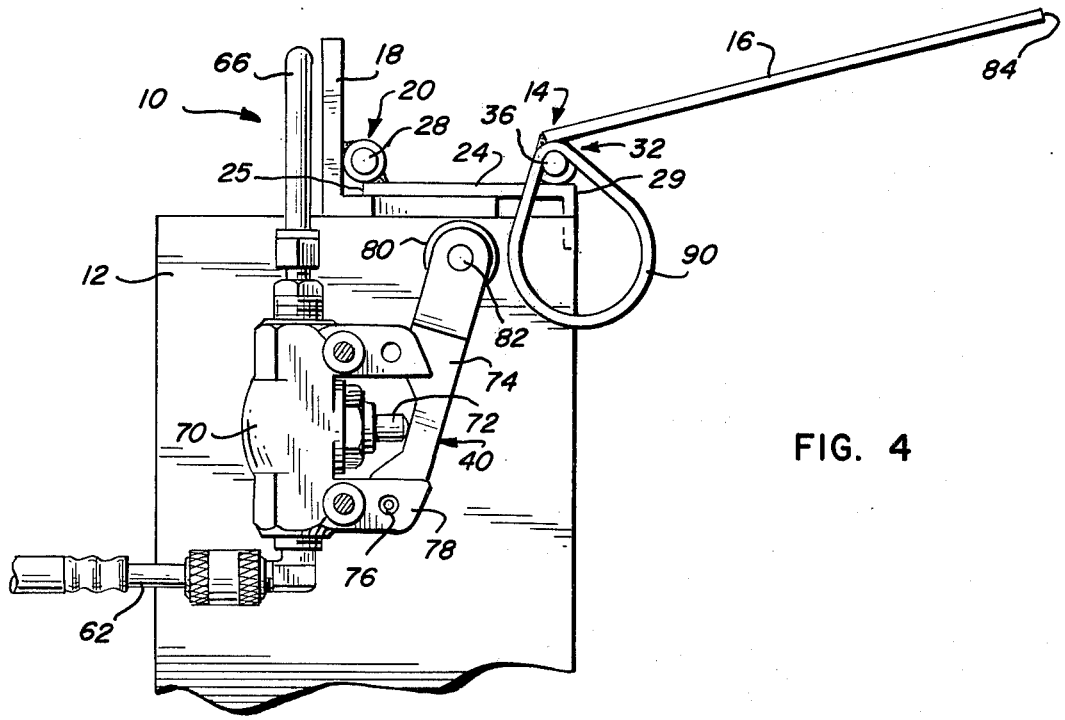
FIG. 4 is a view similar to FIG. 3 showing the safety apparatus in the position assumed when the gate in the open position for loading the machine.

Referring now to FIGS. 1, 3 and 4, main frame 12 includes a bracket portion 18 which supports gate 16 which is illustrated as an L-shaped member which is preferably spaced above and in front of the open area 11 defined by the two dies or press platens 13. Secondary pivot means 20 includes a plurality of sockets 22 secured to bracket 18. Arm or plate 24 has a first edge 25 adjacent L-shaped bracket 18, and has a plurality of sockets 26 secured along a peripheral portion of the plate adjacent edge 25. Pivot pins 28 are inserted into sockets 22 and 26 so that plate 24 pivots about pivot pins 28, with secondary pivot axis B—B passing through the center line of pivot pins 28. Pivot pins 28 may be separate members, or can be permanently attached to sockets 22 or sockets 26.

Plate 24 has a second edge 29 which is parallel to first edge 25. A plurality of sockets 30 are secured to plate 24 along a peripheral portion of the plate adjacent edge 29. Sockets 30 form a part of primary pivot means 32. Gate 16 has a plurality of sockets 34 along one end thereof, and a plurality of pivot pins 36 permanently attached to sockets 34. Alternatively, the pivot pins can be permanently attached to sockets 30 or may comprise separate members. Primary pivot axis A—A intersects the center line of pivot pins 36. Gate 16 is thereby pivotable about pivot pins 36 and can be rotated with respect to safety apparatus 14 and plate 24.

Gate 16 may be made of any suitable material, such as hard rubber, plastic or metal, preferably in the shape of a rectangular plate. Gate 16 may be a solid plate, or, as illustrated in FIG. 1, may have a grating 37 positioned in a central portion of the gate to provide a window through which an operator may view the dies when the gate is in the closed position.

Gate 16 cooperates with switch means 40 that forms part of a protective circuit that prevents actuation of the hydraulic ram when the gate is in a position other than the closed position illustrated in FIG. 1.

Figure 2:
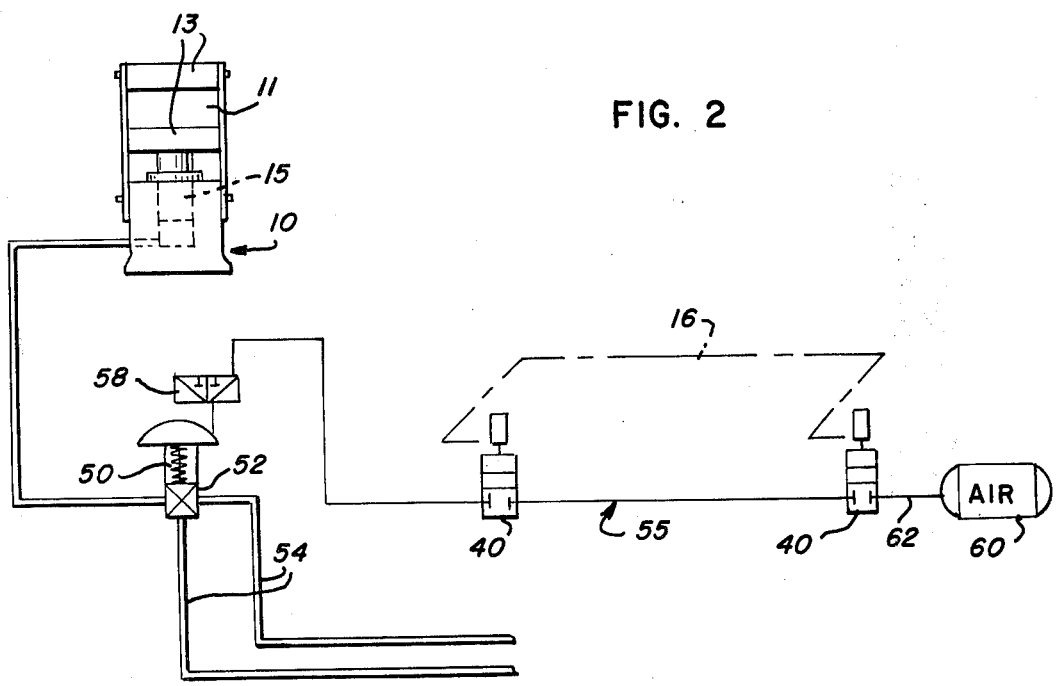
FIG. 2 is a schematic illustration of the pneumatic and hydraulic circuits of the machine and safety apparatus illustrated in FIG. 1.

The protective circuit, which prevents movement of the hydraulic ram when gate 16 is open, is illustrated schematically in FIG. 2. As stated above, the dies are moved relative to each other by a hydraulic ram or other hydraulic powered means which has fluid supplied thereto through a hydraulic circuit 54 having a normally closed control valve 50. Valve 50, which is preferably a pneumatic valve, but can be electric, is normally held in a closed position by spring 52 and air pressure within, thus preventing fluid from being supplied to the hydraulic ram through circuit 54. Pneumatic circuit 55 is connected to control valve 50 through a pressure responsive valve 58. When there is sufficient air pressure in pneumatic circuit 55 to open pressure responsive valve 58, valve 50 opens, enabling fluid to be supplied to the slidable ram to actuate ram 15 or other hydraulic powered equipment.

Pneumatic circuit 55 includes source of air 60 connected to valve 58 through conduit 62 which has two or more switch means 40 positioned in series therein. When both switch means 40 are opened, air is permitted through conduit 62 in pneumatic circuit 55 to pressure responsive valve 58, which enables control valve 50 to open so that hydraulic fluid may be supplied to actuate the ram. As indicated above, two switch means 40 are located in circuit 55. Both switch means must be actuated simultaneously if hydraulic fluid is to be supplied to actuate the ram. The switch means are actuated by the cams when gate 16 is lowered but can be actuated by the operator holding both hands on the switch levers simultaneously, the operator thereby having both hands out of the operating area. Since both switch means are identical in construction, one being located at either end of gate 16, only one has been illustrated in detail in the drawings.

Referring now to FIGS. 1, 3 and 4, switch means 40 includes a normally closed valve consisting of a valve housing 70 which is mounted on frame 12 and has a valve stem 72 protruding outwardly through valve housing 70. In FIG. 4, valve stem 72 is illustrated in the fully extended closed position, to which it is normally biased, by a spring (not shown) and air pressure from within. Switch means 40 also includes an actuator lever 74 adjacent valve stem 72. Lever 74 is pivotable about pivot pin 76 which may be secured directly to frame 12, or to arm 78 which is fastened to valve housing 70. The rotatable free end of lever 74 has a roller 80 attached thereto by a pivot pin 82. The movement of lever 74 is controlled by pivotal movement of gate 16 between open and closed positions. This movement is preferably accomplished by a cam 90 connected to gate 16.

The operation of apparatus 10 and safety apparatus 14 is as follows. When gate 16 is closed (FIG. 1), the open area between the dies or platens is shielded and cam 90 is in contact with roller 80 and lever 74 is pressed against valve stems 72 to open switches 40, thereby permitting operating air to pass to pressure responsive valve 58. When there is sufficient air pressure, pneumatic valve 50 is opened and hydraulic fluid can be supplied to the ram to actuate the ram through the actuation of valve 50 in the hydraulic circuit.

When gate 16 is manually pivoted about primary pivot axis A—A to the position illustrated in FIG. 4, in which cam 90 has released roller 80, valve stem 72 is in the fully extended position so that switch means 40 is closed. In this position pressure responsive valve 58 connects valve 50 to atmosphere and pneumatic valve 50 is thus closed and the ram is inoperative. Therefore, the ram can only be operated when gate 16 is in a completely closed position shown in FIG. 1.

The safety function of safety apparatus 14 is best illustrated in FIG. 3. When gate 16 is rotated about primary pivot axis A—A from the open position of FIG. 4 to the closed position of FIG. 1, control valve 50 is opened and hydraulic fluid is permitted to flow to the slidable ram so that the ram may move toward the opposite die-carrying member. If an obstruction is aligned with gate 16, such as an operator having his arm positioned between the dies, the obstruction will move upwardly as the lower die rises and the obstruction will contact the lower edge 84 of gate 16 and lift gate 16 and plate 24, causing them to pivot about secondary pivot axis B—B. As the gate and plate are pivoting, outwardly spring and air pressure biased stem 72 moves outwardly, so that lever 74 moves outwardly in the direction of arrow D and roller 80 extends under cam 90 to thereby lock gate 16 and plate 24 in the safety position illustrated in FIG. 3. Cam 90 is thereby moved to a position beyond the free end of lever 74, allowing valve 58 to close and connect valve 50 to the atmosphere to stop the upward movement of the ram. Pressure responsive valve 58 is preferably a "quick release" valve so that movement of the ram will stop instantly.

The ram will remain in this position until the operator releases the safety by rotating gate 16 about primary pivot axis A—A in the direction of arrow E (FIG. 3) until cam 90 is moved beyond roller 80 and safety apparatus 14 assumes the open position illustrated in FIG. 4. Apparatus 10 can then be normally operated in the usual manner by rotating gate 16 about primary pivot axis A—A to close the gate so that cam 90 engages roller 80 and lever 74 depresses valve stem 72 to activate valve 50.

In order for gate 16 to pivot about secondary pivot axis B—B when gate 16 is contacted by an obstruction, the plane formed between the primary pivot axis A—A and the secondary pivot axis B—B is angularly related to the plane of gate 16, and is preferably perpendicular when the gate is in the closed position of FIG. 1.

Only a portion of apparatus 10 and safety apparatus 14 are illustrated in FIG. 1. Preferably, as indicated above, safety apparatus 14 includes a cam 90 on each end of gate 16, with a corresponding switch means 40 which can be activated by cam 90. Having cams 90 and switches 40 positioned at both ends of gate 16 and spaced a distance requires the operator to use both hands to operate the press when gate 16 is raised to give the operator a clearer view of the mating of the die or mold parts.

Similarly, on a two man press, safety apparatus 14 is installed on each side of apparatus 10 to protect the area between each ram and stationary member. Cams 90 and switch means 40 are positioned at both ends of each gate 16. Air supplied from source 60 is circuited through all four of the corresponding switches 40 in series, so that one operator cannot activate the ram to move upwardly if the other operator has gate 16 in the open position of FIG. 4 with the open area 11 between the dies or platens exposed.

The safety apparatus is depicted herein for a press wherein the vertically slidable ram moves upwardly to contact the stationary member. However, the safety apparatus of the present invention is equally adaptable to other types of presses.

While this invention is susceptible of embodiment in many different forms, there is shown in the drawings and described herein in detail a preferred embodiment of the invention, with the understanding that the present disclosure is to be considered as an exemplification of the principles of the invention and is not intended to limit the invention to the embodiment illustrated.

I claim:

1. Safety apparatus for a press or the like having relatively movable dies defining an open area therebetween for receiving an article, comprising a gate;
   primary pivot means on said gate defining a primary pivot axis adjacent said open area about which said gate is movable from an open position to expose said open area to a closed position to shield said open area;
   secondary pivot means defining a secondary pivot axis generally parallel to and spaced from said primary pivot axis;
   normally closed switch means cooperating with said press;
   said switch means being positioned to be opened by said gate when said gate is moved about said primary axis from said open position to said closed position and to allow said switch to close when moved about said primary axis from said closed position to said open position to interrupt the movement of said dies; and
   said gate pivoting about said secondary pivot axis when an obstruction is aligned with said gate to allow said switch means to close and interrupt the movement of said dies.

2. Safety apparatus as defined in claim 1, wherein said gate is generally planar, and
   a plane formed by said primary pivot axis and said secondary pivot axis is angularly related to said plane of said gate when said gate is in said closed position.

3. Safety apparatus as defined in claim 1, wherein said switch means comprises at least two valves which have a valve element biased to a closed position and moved to an open position by said gate.

4. Safety apparatus as defined in claim 3, wherein said dies are moved relative to each other by hydraulic power means having fluid supplied thereto through a hydraulic circuit having a normally closed control valve means therein, further including a pneumatic circuit having said at least two valves therein, said pneumatic circuit being connected to said control valve means and supplying pneumatic fluid thereto when said at least two valves are in an open position to hold said control valve means in an open position.

5. Safety apparatus as defined in claim 4, in which said pneumatic circuit has at least four normally closed valves therein, said apparatus having at least two gates, each said gate having first and second cams secured thereto for holding said valves in an open position when each said gate is in said closed position.

6. Safety apparatus as defined in claim 3, further including a lever pivoted adjacent said at least two valves and having a free end, and a roller mounted on said free end of said lever, and a cam secured to said gate for engaging said roller.

7. Safety apparatus as defined in claim 6, in which said cam is moved to a position beyond the free end of said lever when said gate is pivoted about said secondary pivot axis.

8. Safety apparatus for a press or the like having relatively movable dies defining an open area therebetween for receiving an article, comprising a gate;
   primary pivot means on said gate defining a primary pivot axis adjacent said open area about which said gate is movable from an open position to expose said open area to a closed position to shield said open area;
   secondary pivot means defining a secondary pivot axis generally parallel to and spaced from said primary pivot axis;
   said dies being movable relative to each other by hydraulic power means having fluid supplied thereto through a hydraulic circuit having a normally closed control valve means;
   normally closed switch means including at least two switches spaced apart and connected in series to said valve means;
   said switches being opened and thereby opening said valve means when said gate is moved about said primary pivot axis from said open position to said closed position, and said switches closing and thereby closing said valve means when said gate is moved about said primary pivot axis from said closed position to said open position; and
   said gate pivoting about said secondary pivot axis when an obstruction is aligned with said gate to allow said switch means to close and interrupt the movement of said dies.

9. Safety apparatus as defined in claim 8, wherein each said switch means comprises a valve having an element biased to a closed position and movable to an open position by said gate.

10. Safety apparatus as defined in claim 9, wherein said dies are moved relative to each other by hydraulic power means having fluid supplied thereto through a hydraulic circuit having a normally closed control valve means therein, further including a pneumatic circuit having therein said valve for each said switch, said pneumatic circuit being connected to said control valve means and supplying pneumatic fluid thereto when said both said valves are in an open position to hold said control valve means in an open position.

11. Safety apparatus as defined in claim 10, in which said gate has a cam secured thereto for each said switch for holding each of said valves in an open position when said gate is in said closed position.

12. Safety apparatus as defined in claim 9, further including a lever pivoted adjacent said valve for each said switch and having a free end, and a roller mounted on said free end of each said lever, and a cam secured to said gate for each said switch for engaging said roller.

13. Safety apparatus as defined in claim 12, in which each said cam is moved to a position beyond the free end of said lever when said gate is pivoted about said secondary pivot axis.

* * * * *